(12) United States Patent
Crowley et al.

(10) Patent No.: US 11,274,251 B1
(45) Date of Patent: Mar. 15, 2022

(54) METHOD OF STRENGTHENING SOIL VIA CHEMICAL INDUCEMENT

(71) Applicants: Raphael Crowley, Ponte Vedra Beach, FL (US); Matthew Davies, Saint Johns, FL (US); Nick Hudyma, Boise, ID (US); Joshua Sasser, Jacksonville, FL (US)

(72) Inventors: Raphael Crowley, Ponte Vedra Beach, FL (US); Matthew Davies, Saint Johns, FL (US); Nick Hudyma, Boise, ID (US); Joshua Sasser, Jacksonville, FL (US)

(73) Assignee: University of North Florida Board of Trustees, Jacksonville, FL (US)

( * ) Notice: Subject to any disclaimer, the term of this patent is extended or adjusted under 35 U.S.C. 154(b) by 13 days.

(21) Appl. No.: 16/946,919

(22) Filed: Jul. 10, 2020

Related U.S. Application Data

(60) Provisional application No. 62/873,042, filed on Jul. 11, 2019.

(51) Int. Cl.
*C09K 17/48* (2006.01)
*E02D 3/00* (2006.01)
*C09K 101/00* (2006.01)

(52) U.S. Cl.
CPC ............ *C09K 17/48* (2013.01); *E02D 3/00* (2013.01); *C09K 2101/00* (2013.01)

(58) Field of Classification Search
CPC .. E02D 3/00; E02D 3/12; E02D 3/126; C09K 17/48
USPC ............... 405/258.1, 263–269, 302.4, 302.6
See application file for complete search history.

(56) References Cited

U.S. PATENT DOCUMENTS

2016/0289559 A1* 10/2016 Madduri .............. E02D 3/12

FOREIGN PATENT DOCUMENTS

| CA | 2281164 A1 | | 2/2001 | |
|----|------------|----|--------|----|
| CN | 104531161 A | * | 4/2015 | |
| CN | 105188970 A | * | 12/2015 | ............ B09C 1/00 |
| CN | 106400778 A | * | 2/2017 | |
| CN | 108841391 A | * | 11/2018 | |

(Continued)

OTHER PUBLICATIONS

Mohammed Huudu Yahaya "Evaluation of Florida Organic Soils Treated by Microbial Induced Calcite Precipitation (MICP) and Surfactants" pp. 1-121, Aug. 2018.*

(Continued)

*Primary Examiner* — Frederick L Lagman
(74) *Attorney, Agent, or Firm* — Smith & Hopen, P.A.; Michele L. Lawson

(57) ABSTRACT

Methods for increasing soil stabilization utilizing an anionic surfactant and a solution. Varying amounts of the anionic surfactant sodium dodecyl sulfate ("SDS") is added to soils along with a solution of calcium chloride. A mixing procedure is then used to mix the SDS-soil matrix with the calcium chloride solution. The micelles surround the soil particles, creating a matrix, and then the calcium ions of the calcium chloride solution bonds the micelle complex together. The resulting calcium dodecyl sulfate ("CDS") complex is very hard, relatively insoluble, and very strong. This process can be reversed by exposing the CDS complex to seawater. The sodium ions of the seawater exchange with the calcium ions of the CDS complex reforming the SDS surfactant.

20 Claims, 12 Drawing Sheets

(56) References Cited

FOREIGN PATENT DOCUMENTS

CN 107267121 B 4/2020
CN 111349445 A * 6/2020

OTHER PUBLICATIONS

Crowley et al., "Application of Microbial Induced Calcite Precipitation (MICP) to Stabilize Florida HighOrganic Matter Soils for Roadway Construction" pp. 1-28, Aug. 2018.*
Crowley et al., Application of Microbial Induced Calcite Precipitation to Stabilize Florida High-Organic Matter Soils for Roadway Construction. Final Report, FDOT Project No. BDV34-977-06. Florida Department of Transportation. Mar. 2019. Tallahassee, FL.
Davies et al., Microbially Induced Calcite Precipitation Using Surfactants for the Improvement of Organic Soil. Eighth International Conference on Case Histories in Geotechnical Engineering. Geo-Congress 2019: 1-10.
Dejong et al., Microbially Induced Cementation to Control Sand Response to Undrained Shear. Journal of Geotechnical and Geoenvironmental Engineering. 2006. vol. 132 (No. 11): 1381-1392.
Gue et al., Cost Effective Geotechnical Solutions for Roads and Factories Over Soft Ground 20th Conference of the ASEAN Federation of Engineering Organizations, Cambodia, Sep. 2-5, 2002: 1-9.
Huat et al., Geotechnics of Organic Soils and Peat CRC Press, Taylor and Francis Group, Boca Raton, FL. 2014: 1-279.
Lukas, R. Dynamic Compaction for Highway Construction, vol. I: Design and Construction Guidelines. Federal Highway Administration Report FHWA/RD-86/133. Jul. 1986: 1-230.
Mullins et al., Soil Mixing Design Methods and Construction Techniques for Use in High Organic Soils. FDOT Final Report No. BDV25-977-14. Florida Department of Transportation. Tallahassee, FL. Oct. 2015: 1-407.
Translation of Chinese Patent No. CN 107267121 B (filing date: Aug. 10, 2017) with a publication date of Apr. 21, 2020.

* cited by examiner

200 — Distributing to the soil a first aqueous solution including sodium dodecyl sulfate, such that the sodium dodecyl sulfate dissociates into sodium ions and dodecyl sulfate ions when in the first aqueous solution, wherein upon exceeding the first aqueous solutions critical micelle concentration a plurality of micelles are formed such that an interior hydrophobic pocket of the micelles is capable of absorbing the soil thereby solubilizing the soil into an aqueous soil media 202 — Distributing to the aqueous soil media an alkaline earth metal solution, wherein the aqueous soil media and the alkaline earth metal solution are mixed 204 — Forming an alkaline earth metal dodecyl sulfate complex, thereby increasing the strength of the soil

FIG. 11

METHOD OF STRENGTHENING SOIL VIA CHEMICAL INDUCEMENT

CROSS-REFERENCE TO RELATED APPLICATIONS

This U.S. Non-Provisional Patent application claims priority to U.S. Provisional Patent Application No. 62/873,042, entitled "Method of Strengthening Soil Via Chemical Inducement," filed Jul. 11, 2019, by the same inventors, the entirety of which is incorporated herein by reference.

FEDERALLY SPONSORED RESEARCH OR DEVELOPMENT

This invention was made with Government support under Grant No. BDV34 977-06 awarded by the Florida Department of Transportation. The government has certain rights in the invention.

BACKGROUND OF THE INVENTION

1. Field of the Invention

This invention relates, generally, to a technique for increasing soil strength and stability. More specifically, it relates to a method for the improvement of soil strength and stability using an anionic surfactant such as sodium dodecyl sulfate ("SDS") and an alkaline earth metal.

2. Brief Description of the Prior Art

Humans throughout history have been attempting to stabilize the ground beneath them as the demand for construction and development around the world has steadily increased. Often soil needs to be stabilized for construction purposes, such as the construction of new buildings and roadways. However, it can also be beneficial to stabilize soil for other purposes as well, such as increasing sand's resistance to erosion and scour or because of issues associated with creep or settlement.

The following includes a brief listing of the previous methods commonly used when stabilizing soil and associated shortcomings of each.

Cut and Replace

Cut-and-replace is commonly used as a stabilization technique for soils when practical. The issues with this technique are (1) cost; and (2) feasibility. For deeper deposits, replacement is often not practical because the expense is cost-prohibitive (Mullins and Gunaratne, 2015). Gue et al. (2002) found that excavation and replacement are viable to a maximum depth of 15 feet (4.5 m). Additionally, when organic material is present, removal of soil will lead to organic decomposition; decomposition will lead to carbon atmospheric carbon release; and the carbon can contribute to global warming.

Increasing Bearing Area

Increasing the bearing area of foundation elements or embankments will decrease the stresses applied to the soil, which will, in turn, decrease settlement and decrease the chance of bearing capacity failure. Increasing the bearing area is directly related to costs; increasing the bearing area means a larger foundation or increased widths of embankments. There are both material and right-of-way acquisition costs associated with this technique.

Surcharge with or without Wick Drains

As discussed in Mullins and Gunaratne (2015), wick drains may be an effective means to reduce soil consolidation time by shortening drainage paths. These drains are installed before surcharging throughout the treatment area. While they are usually prefabricated drains, they may also be stone or sand columns. Their efficiency is dependent upon spacing, drain diameter, and material disturbance/interface smear formed during installation.

Several drains are readily available from wick drain manufacturers, and for stabilization programs involving soil mixing, installation of these drains may be very useful. However, as Mullins and Gunaratne (2015) point out, these are only an effective treatment method when primary consolidation dominates relative to secondary consolidation. This behavior should only be expected in clays.

Stone Columns

Stone columns, or inclusions installed by packing sand or stone into a borehole, are often used to stabilize some soils—particularly sinkhole prone areas. However, as discussed by Mullins and Gunaratne (2015), soil columns are sometimes not a suitable method for stabilizing soils because of the progressive loss of confinement stress necessary for radial support of the columns.

Dynamic Compaction

Dynamic compaction is a method of densifying soil via successive drops of a heavy weight (up to 40 tons) from a significant height (up to 100 feet). While this may be an effective treatment technique, construction difficulties can occur if the water table is not maintained at least six to seven feet below the ground surface (Lukas, 1986; Mullins and Gunaratne, 2015).

Soil Mixing

Mullins and Gunaratne (2015) discuss soil mixing in-depth. To summarize, numerous proprietary methods for soil mixing exist where a binder such as lime, slag, or cement is mixed with in situ material to improve its engineering characteristics. In particular, soil-cement has been used for decades. The soil-cement is prepared via an above-ground process and added to the soil via jet grouting, wet mixing, or dry mixing.

The Mullins and Gunaratne (2015) study involved several bench tests, large-scale laboratory tests, and full-scale mixing tests. Results showed a consistent improvement, and design guidelines were developed for soil mixing implementation. While these are positive benefits, the issue with soil mixing, in general, is its sustainability in that addition of large quantities of cement, lime, or slag may cause environmental issues. Specifically, the presence of some substances in concrete, particularly some of its additives, may cause health concerns due to toxicity and radioactivity. Additionally, many studies indicate that Portland cement/concrete production is a significant contributor to global carbon dioxide ($CO_2$) (up to 5%) through chemical processes and manufacturing energy. In addition, large quantities of cement/grout are required using this method. In some soils, particularly soils with high organic contents (~50% organic content by mass), it is thought that much of this material acts as void fill and not as a cementing agent. Using such large quantities of material may be very expensive.

Other stabilization techniques such as using lime kiln dust or fly ash are harmful to humans (e.g., carcinogenic) and can lead to harmful environmental effects such as an increase in soil/water pH. Lime kiln dust is chemically stable and reacts vigorously with water, releasing heat in the process. Fly ash is a coal combustion product that is composed of fine particles of burned fuel and contains crystalline silica, which is a known carcinogen.

Microbial Induced Calcite Precipitation ("MICP") or Enzyme-Induced Soil Precipitation (EICP)

The MICP/EICP chemical reaction process has been detailed by several researchers, including DeJong et al. (2006). Both processes are similar in the sense that urease is used to lyse urea. This initiates a chain-reaction that eventually results in the formation of carbonate ions. If calcium ions are present in the soil, calcium carbonate will form as a precipitate. MICP utilizes bacteria to initiate these reactions while EICP bypasses the microbes and instead utilizes synthesized urease. While both these technologies are sustainable, there are instances where the chemical processes associated with urea lyses will not lead to carbonate formation—particularly in acidic soils. Likewise, in soils with low hydraulic conductivities, the MICP/EICP processes would function poorly because it would be difficult to sufficiently distribute the chemical constituents.

Other Non-Traditional Stabilization Techniques

Chinese Patent No. CN 107267121B discloses a processing method of dust suppression during loading, transporting, and stirring of powdery sludge curing agents (curing agents), similar to that of Portland Cement discussed in the Soil Mixing section above. Several surfactants are added to the curing agent to prevent problems of caking and heating when water is added to the curing agent. When the surfactants are added to the curing agent, a humidifying curing agent is obtaining that is then placed on a transportation device such as a light, medium, or heavy-duty truck. Once the transportation device reaches the destination, is it unloaded and constructed. This process is starkly different from the present invention, which focuses on stabling soil using an alkaline earth metal solution and an anionic surfactant in combination. Accordingly, the Chinese patent fails to provide an environmentally friendly, non-toxic, and effective method of stabilizing the soil using an anionic surfactant and an alkaline earth metal solution.

Canadian Patent Publication No. CA 2281164A1 discloses a soil stabilizing agent comprised of an amount of a cationic surfactant, in which the stabilized soil is formed by the mixing of the soil and the stabilizing agent. Specifically, the patent is directed toward using a cationic surfactant and not an anionic surfactant and alkaline earth metal solution in combination. In fact, the Canadian patent discloses that "anionic chemicals are not fully satisfactory or suitable for stabilizing soil, and more particularly, for modifying the hydrophilic nature of the soil." Accordingly, the Canadian patent fails to increase the UCS of soil using an anionic surfactant and an alkaline earth metal.

Need for a New Soil Stabilization Technique

Accordingly, what is needed is a novel method for soil strengthening that can be used to stabilize soil and overcomes the environmental, expense, feasibility, and/or biological limitations that prior methods encompass. In particular, what is needed is a novel method for increasing the unconfined compression strength ("UCS") of soil by utilizing an anionic surfactant and an alkaline earth metal solution to form a strengthening complex. In view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in several technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a method of increasing the strength of soil by mixing the soil with an anionic surfactant and an alkaline earth metal solution is now met by a new, useful, and nonobvious invention.

The novel structure includes a method for increasing the strength of the soil. An anionic surfactant, such as sodium dodecyl sulfate, is distributed to the soil by mixing or spraying the anionic surfactant directly to the soil. An alkaline earth metal, such as calcium or magnesium, is similarly distributed to the soil. The alkaline earth metal may be from another dissolved source (for example, calcium chloride or magnesium chloride). In an embodiment, one or more alkaline earth metals can be used together in combination. When the soil, anionic surfactant, and alkaline earth metal are combined, the soil is strengthened as a result of the formation of an alkaline earth metal dodecyl sulfate complex.

In an embodiment, the anionic surfactant and the alkaline earth metal solution are stoichiometrically balanced to ensure optimal reaction and strengthening of the soil. In an embodiment, the optimum anionic surfactant-to-soil ratio is between about 0.01:1 and 0.15:1 when measured by weight, although these values may vary based upon soil density.

In an embodiment, the method of increasing the strength of the soil includes distributing to the soil a first aqueous solution, including sodium dodecyl sulfate. In solution, the sodium dodecyl sulfate dissociates into sodium ions and dodecyl sulfate ions. Upon exceeding the critical micelle concentration, a plurality of micelles is formed. Each micelle has an interior hydrophobic pocket that is capable of absorbing or attracting the neutrally charged soil particles, thereby solubilizing the soil into an aqueous soil media. An alkaline earth metal solution is then distributed to the aqueous soil media, where an alkaline earth metal dodecyl complex is formed, which increases the strength of the soil.

In yet another embodiment, the strength of the soil is increased by mixing a first solution having an amount of sodium dodecyl sulfate and an amount of water. When in solution, the sodium dodecyl sulfate dissociates and forms a plurality of micelles. A second solution is mixed containing an amount of calcium chloride and an amount of water, such that when in the solution, the calcium chloride dissociates into a plurality of calcium ions and a plurality of chloride ions.

The first solution is then distributed to the soil creating a plurality of micelle-soil complexes. When the second solution is distributed to the soil containing the micelle-soil complexes, one calcium ion and two micelle-soil complexes bond and form a calcium dodecyl sulfate complex, which increases the strength of the soil.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 11 is a flow chart diagram of an embodiment of the method of increasing the strength of the soil.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Figure 1:
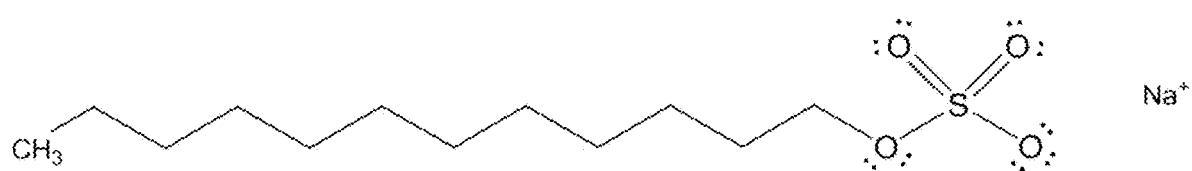
FIG. 1 is a skeletal formula of the molecular structure of sodium dodecyl sulfate ("SDS").

As illustrated in FIG. 1, sodium dodecyl sulfate ("SDS") is a surfactant that contains a linear twelve-carbon chain tail and polar sulfate head. In solution, the sodium ion of the SDS disassociates from the dodecyl sulfate portion yielding a hydrophilic polar head and a neutrally charged hydrophobic tail. In an embodiment, the surfactant can be an anionic surfactant, organosulfate, and/or other compounds with similar chemical structures. In an embodiment, dications create a matrix of micelles from the combination of the dications and the negatively charged sulfate head/carbon tail portion of the SDS and bind the soil together.

Figure 2A:
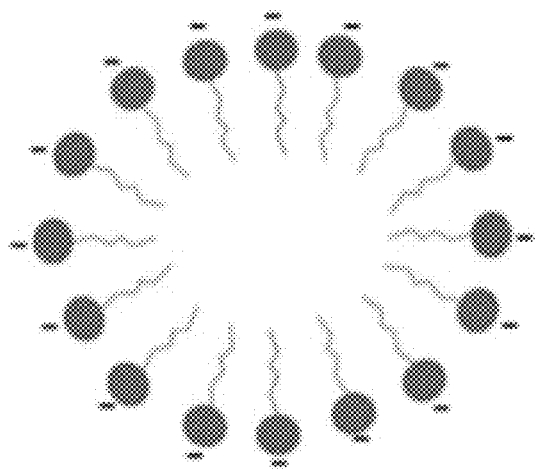
FIG. 2A depicts an SDS micelle structure in aqueous solution.
Figure 2B:
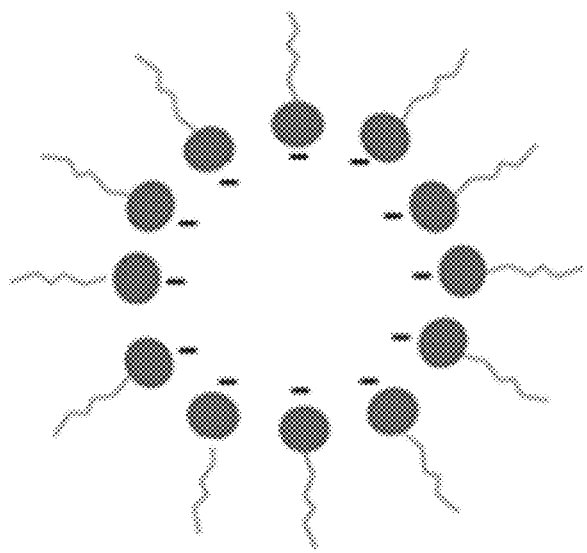
FIG. 2B depicts an SDS micelle structure in a hydrophobic solution.
Figure 2C:
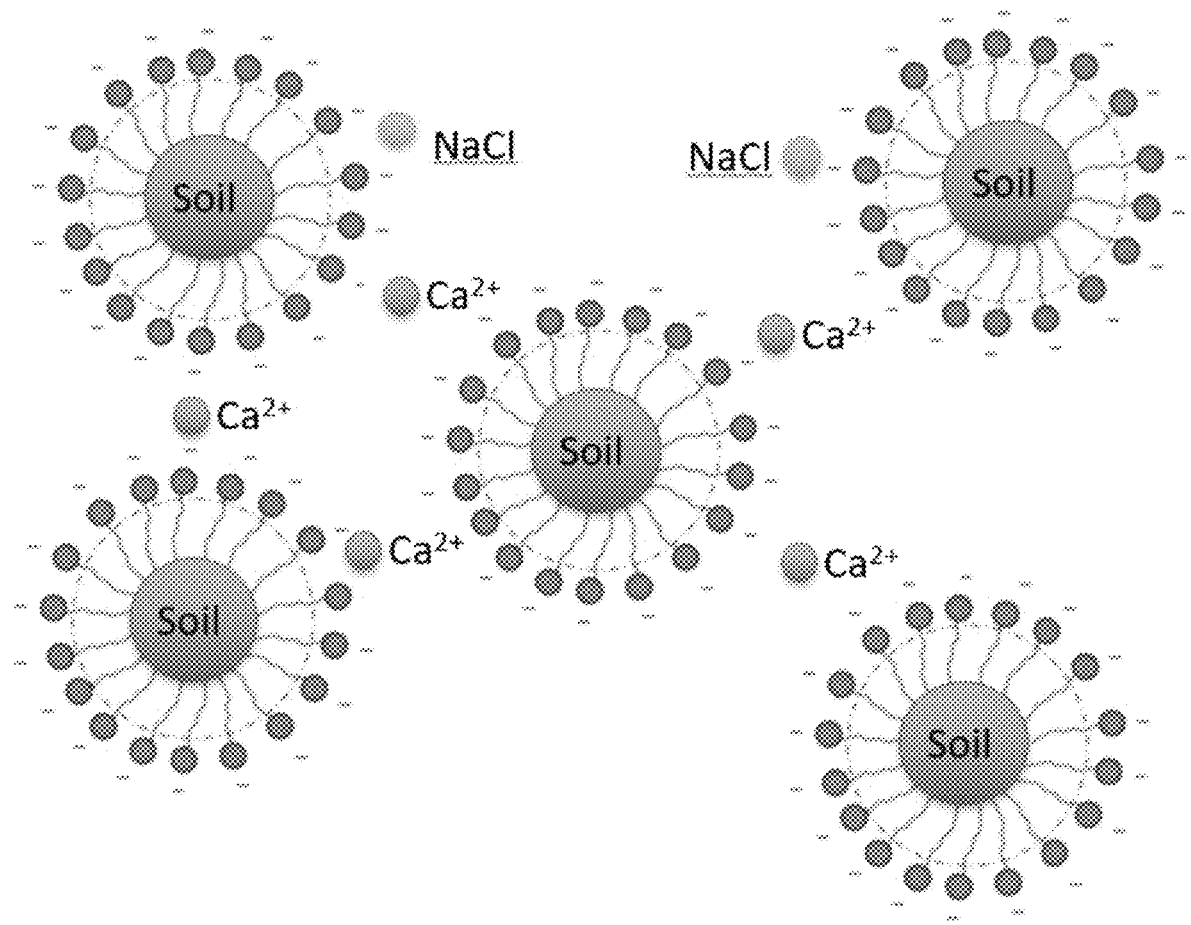
FIG. 2C depicts a calcium dodecyl sulfate complex with soil particles absorbed into the center of the micelles.

When the concentration of any substance passes its critical micelle concentration, the hydrophilic heads and the hydrophobic tails align with one another, creating micelles shown in FIGS. 2A-2C. Micelle shape may vary depending on interfacial conditions. Common micelle shapes include bilayers, spheres, rod-like structures, disc-like structures, vesicles, lamellae, and sponge-phase. Regardless of the shape of the micelle, they interact similarly with neutrally charged particles in solutions. When in solution, micelle formation results in interior hydrophobic pockets that can absorb neutrally charged particles coupled with hydrophilic exteriors capable of interacting with water or other polar solvents. In this way, soil particles can absorb into the interior of the micelle and effectively be solubilized into an aqueous media, as shown in FIG. 2C.

FIG. 2B illustrates the structure of inverted micelles in hydrophobic solutions (e.g., liquid oils), or mixed hydrophobic/hydrophilic solutions, where the mixed solution is far more hydrophobic than hydrophilic. The inverted micelles also occur with an interior hydrophilic pocket containing the polar "heads" and non-polar exterior, where the hydrophobic "tails" point outward. This occurs to reduce the overall system entropy in hydrophobic media and to align "like" chemical properties.

When added to treated soil water, molecules containing alkaline earth metals such as calcium chloride, magnesium chloride, etc., dissolve into positive ions ($2^+$) and negatively charged ions ($1^-$). Each positive ion bonds with two of the negatively charged dodecyl sulfate tails yielding an alkaline earth metal dodecyl sulfate complex. The formation of the calcium dodecyl complex prevents the micelle from achieving a hydrophilic exterior as the hydrophilic heads of the micelles are ionically bonded with $Ca^{2+}$ ions resulting in the strength increase and insolubility of the treated soil.

However, in additional embodiments, other alkaline earth metals, such as beryllium, magnesium, strontium, barium, and/or radium, can be substituted for calcium. In an embodiment, the solution may contain one or more combinations of alkaline earth metals. For example, a solution containing calcium chloride and magnesium chloride can be used in lieu of calcium chloride on its own. In an embodiment, chloride is used due to its ease of bonding with alkaline earth metals; however, other elements besides chloride can be substituted that permit the resulting compound to be dissolved in solution.

Figure 3:
FIG. 3 shows a skeletal formula of a calcium dodecyl sulfate complex.

In an embodiment, the SISS method can be used as a rapid response tool for protecting earthen shoreline structures from erosion. Calcium chloride is used as the "link" between dodecyl sulfate ions, as shown in FIG. 3. In the presence of seawater, the calcium ions exchange with dissolved sodium ions. As such, if used in a saltwater environment, after a few days, an earthen structure (beach dunes for example) would be back to "normal" (i.e., before a storm the dunes/beaches could be treated. After the storm, natural beach processes will return the beach to its untreated state).

First Test Series

During experimentation, several specimens were prepared using the surfactant SISS treatment technique whereby SDS was mixed with soil and an alkaline earth metal. Curing could occur both underwater and in the air. Subsequently, UCStesting was performed on the treated specimens that were generated using calcium as the alkaline earth metal.

Further Testing with Various Soil Types

In an embodiment, testing was expanded, concluding that the SISS method is an effective treatment method for a wide range of soil types. Testing was conducted using the SISS technique with 50/70 Ottawa sand, soil with 30% organic content, Tennessee ball clay ("TBC"), and another clay having an unknown origin that was available to the University of North Florida laboratory ("Clay 1"). Properties of the TBC and Clay 1 can be found in Table 1 below.

TABLE 1

| Clay | Tennessee Ball Clay (TBC) | Clay 1 |
| --- | --- | --- |
| Liquid Limit | 57.9 | 30.4 |
| Plastic Limit | 26.2 | 22.9 |
| Plasticity Index | 31.7 | 7.5 |
| USCS Classification | CH | CL |
| Percent Clay | 80% | 65% |

Figure 4:
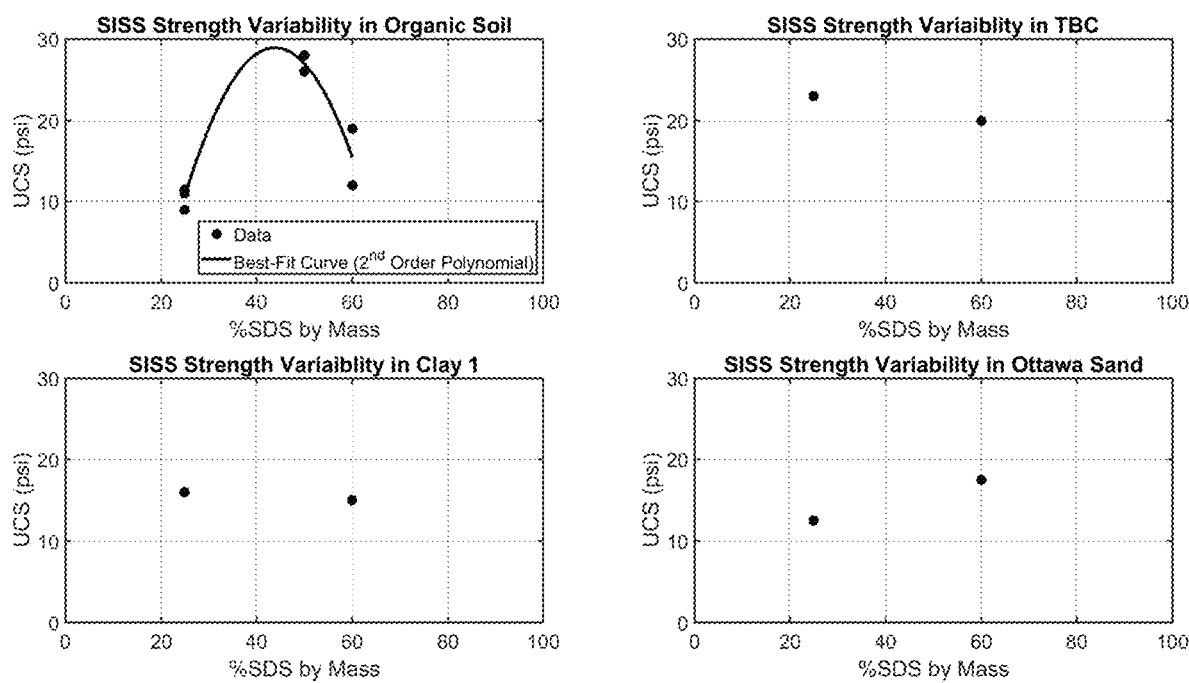
FIG. 4 shows UCS vs. percent SDS for various soil types.
Figure 5:
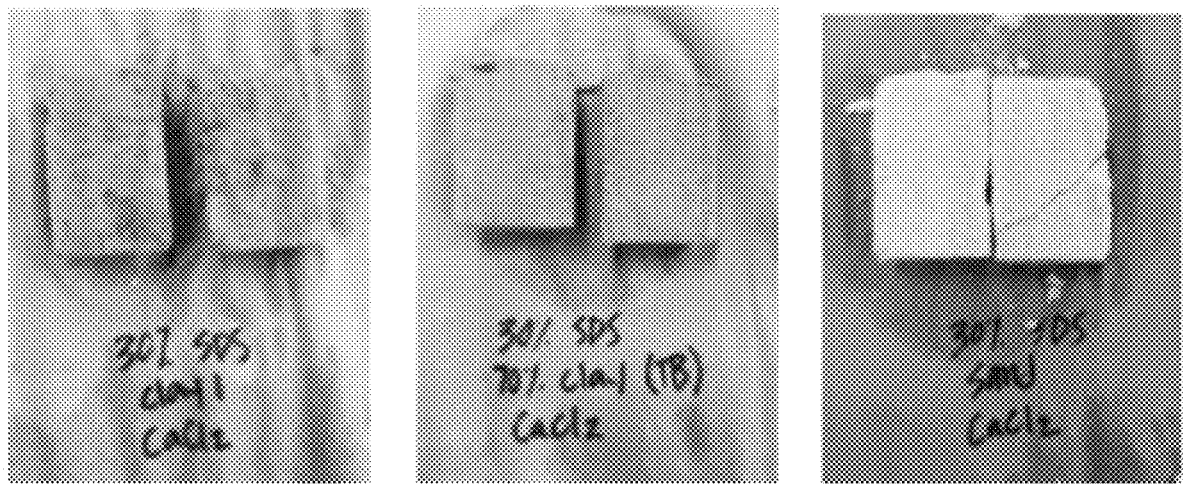
FIG. 5 shows clay 1 (left), Tennessee Ball clay (middle), and Ottawa sand (right) broken apart and analyzed qualitatively after being treated via surfactant-induced soil stabilization (SISS).

These soils were mixed with SDS in 2-inch by 4-inch concrete molds. Then, 40-mL of 2.5 M calcium chloride solution was added to the specimens. The specimens were mixed until they were uniform. After mixing, the specimens were allowed to air dry for a minimum of 48 hours. However, hardening was usually observed within 20 minutes or less. After drying, the specimens were extracted using a Dremel® tool, and UCS testing was performed with results shown in FIG. 4. Specimens were broken apart and further qualitatively analyzed, as shown in FIG. 5.

Similar results to soils with high organic content were found as these other soil types shown relationships between SDS concentration and maximum strength as determined by UCS. Ottawa sand showed a direct relationship between SDS and strength, while clays tended to show an inverse relationship, indicating that further optimization was needed as a function of soil-type (see FIG. 4).

Figure 6:
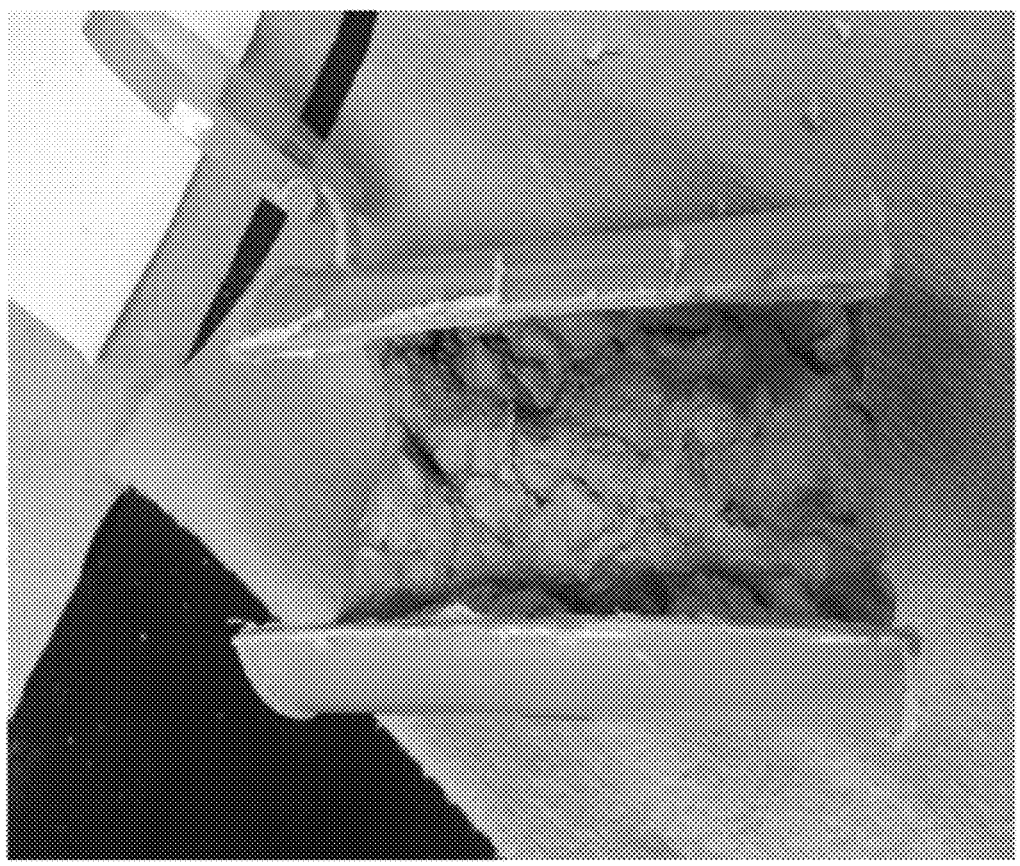
FIG. 6 shows Tennessee ball clay after 48 hours mixed with water in a concrete tube.

Control tests were prepared using the clays. The same procedure detailed above was repeated with the clays by mixing the clays with water only (i.e., no SDS or calcium). After 48 hours, the tubes were cut open. As pictured in FIG. 6, resulting specimens were not fully dry nor where the specimens fully hardened. Additionally, it was not possible to remove the specimen from its tube to finish drying. On-the-other-hand, the clays treated using the SISS technique were all sufficiently hardened after 48 hours allowing for "clean" specimen extraction.

Figure 7:
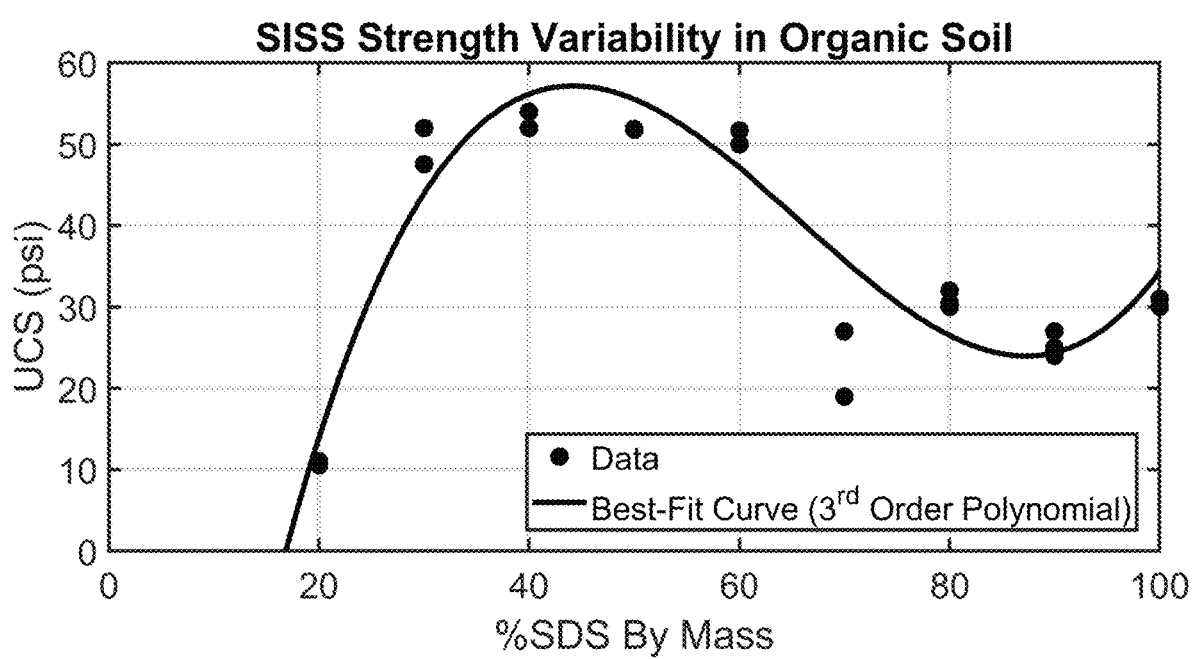
FIG. 7 shows SISS treatment results using soil with approximately 30% organic content.

In an embodiment, a series of testing was conducted using the 30% organic-rich soil from Polk County, Fla. This soil was sieved through a #4 sieve so that soil particle distribution was more uniform. The SISS treatment components, calcium chloride, and SDS were stoichiometrically balanced and used to treat the sieved soil at various SDS percentages. Best-fit regression analysis was used to fit a curve to the data of the form $y=ax^3+bx^2+cx+d$. The results of the above experiments are shown in FIG. 7 depicting a clearly defined optimum SDS/soil ratio between 30% and 60% SDS. Between this optimum range, UCS was on the order of 50 psi.

Figure 8:
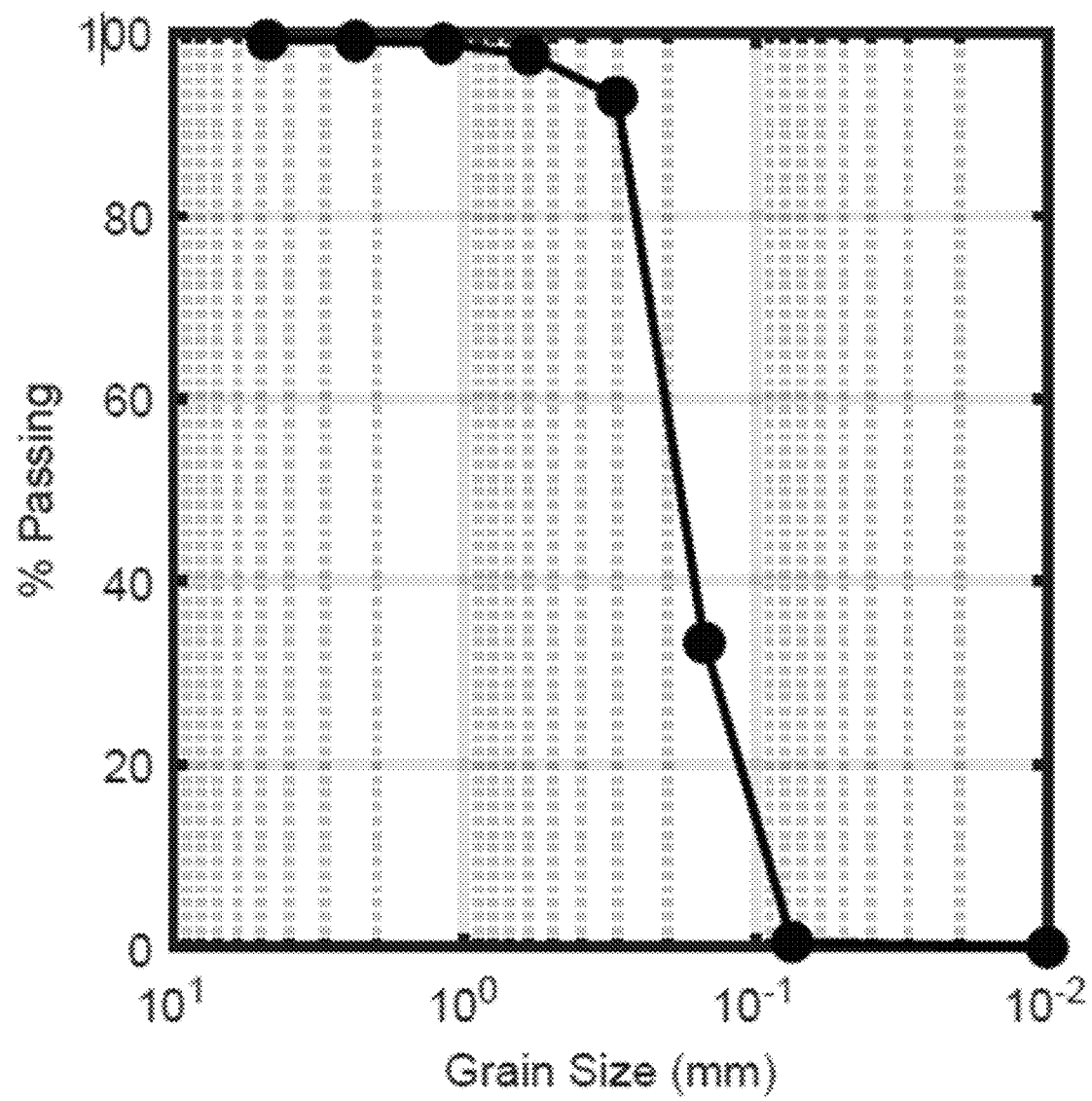
FIG. 8 shows grain size distribution for beach sand.
Figure 9A:
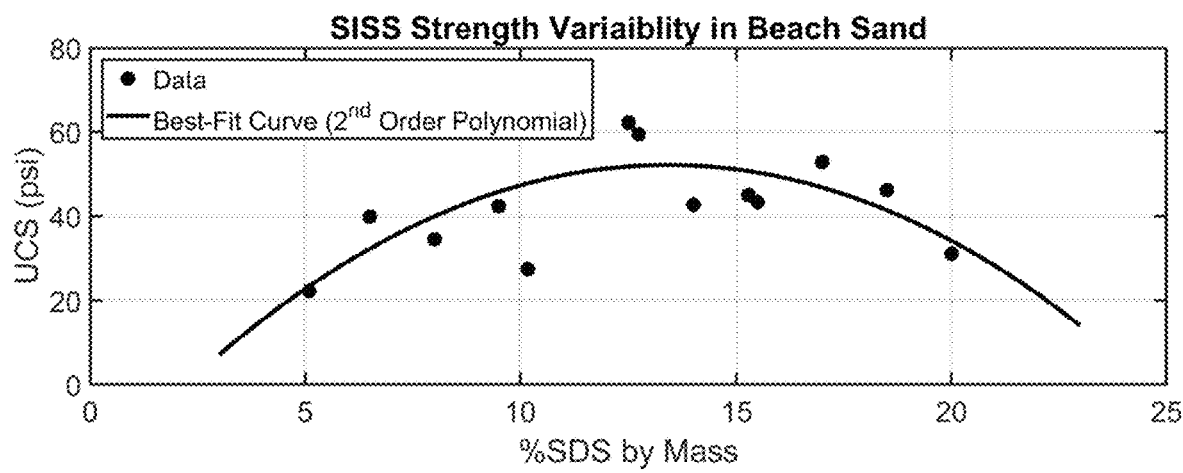
FIG. 9A shows the UCS as a function of SDS mass.
Figure 9B:
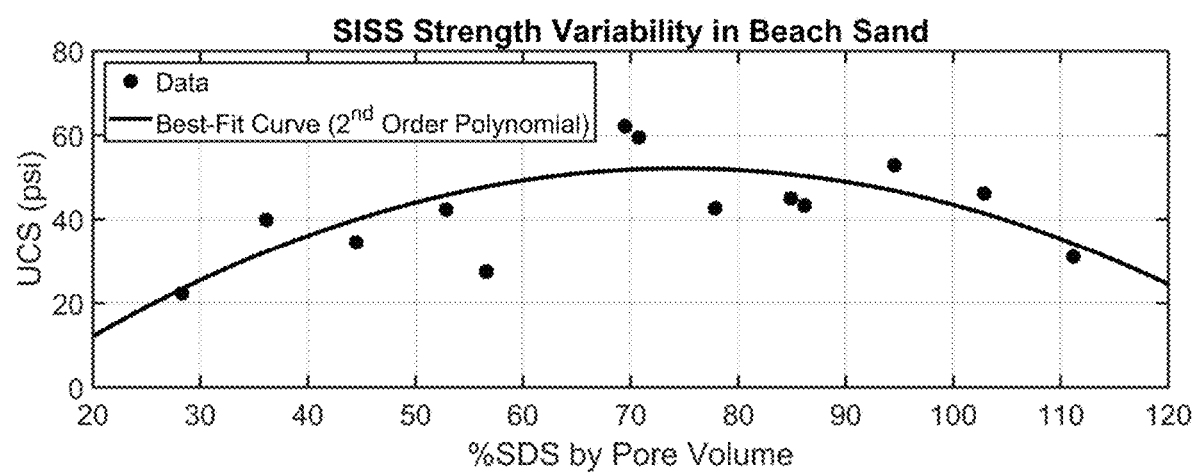
FIG. 9B shows the UCS as a function of SDS pore volume.

In an embodiment, a series of testing was conducted using beach sand obtained from Atlantic Beach, Fla. Grain size distribution for this soil is presented in FIG. 8. Specific gravity, void ratio, and porosity were 2.69, 0.36, and 0.26, respectively. The SISS components, calcium chloride, and SDS, were stoichiometrically balanced and used to treat the soil using varying quantities of SDS/calcium chloride. As depicted in FIGS. 9A and 9B, UCS data were plotted as a function of SDS percentage where SDS percentage was expressed both as a function of mass (see FIG. 9A) and as a percentage of pore volume (see FIG. 9B). Best-fit regression analysis was used to fit a curve of the form $y=ax^2+bx+c$ to the data. Results showed a clearly defined optimum SDS/soil ratio at approximately 13% SDS, which corresponded to approximately 75% of the pore volume filled with SDS. The corresponding UCS was approximately 50 psi.

Application Techniques of SISS

In an embodiment, the SDS can be sprayed onto the soil, and the calcium chloride solution subsequently sprayed or vice versa. In an embodiment, the SDS can be mixed into the soil, then the calcium chloride solution mixed in or vice versa. In an embodiment, the SDS, alkaline earth metal, and soil can be mixed similar to a grout mixing method, injecting, or any other mixing method that a person of ordinary skill in the art would appreciate to combine the SDS, alkaline earth metal, and soil together.

Conclusion

The SISS technique is a novel improvement for soil strengthening used to stabilize the soil. This novel technique is environmentally friendly and relatively inexpensive. To utilize this method, the surfactant and alkaline earth metal solutions can be mixed or added to the soil in a variety of ways. The calcium ions create a matrix of micelles from the combination of positive calcium ions (e.g., the dications) and the negatively charged sulfate head/carbon tail portion of the SDS (e.g., the surfactant), and hold the soil together.

Figure 10:
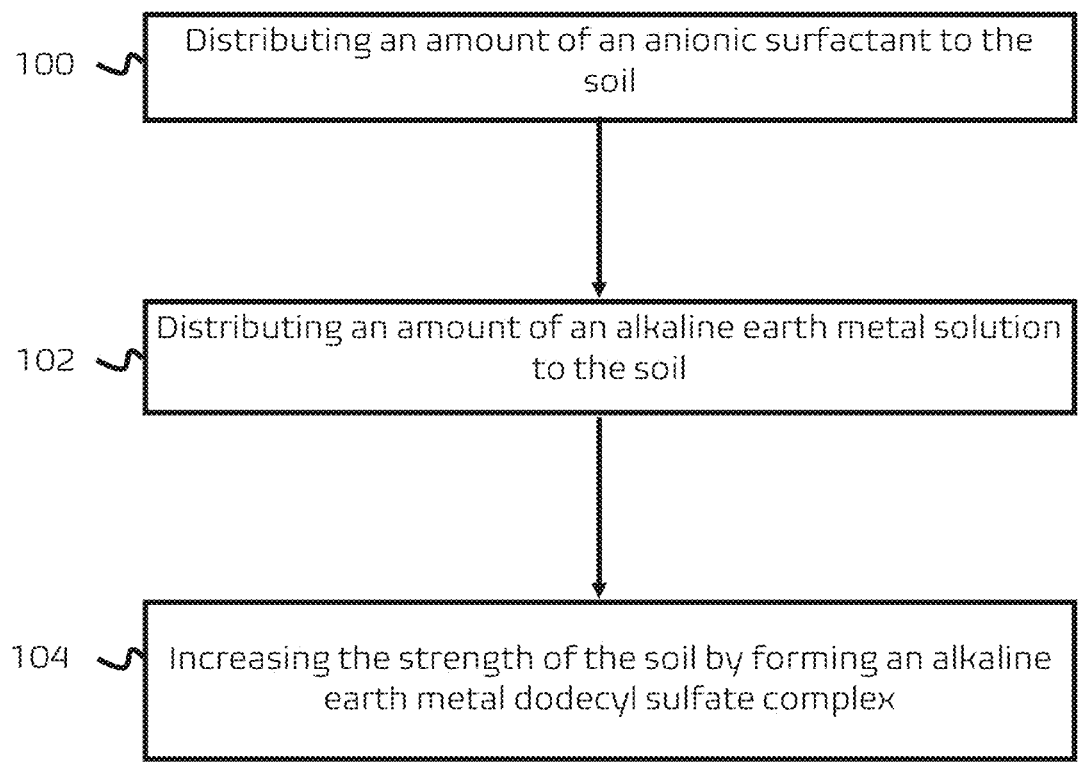
FIG. 10 is a flow chart diagram of an embodiment of a method of increasing the strength of the soil.
Figure 12:
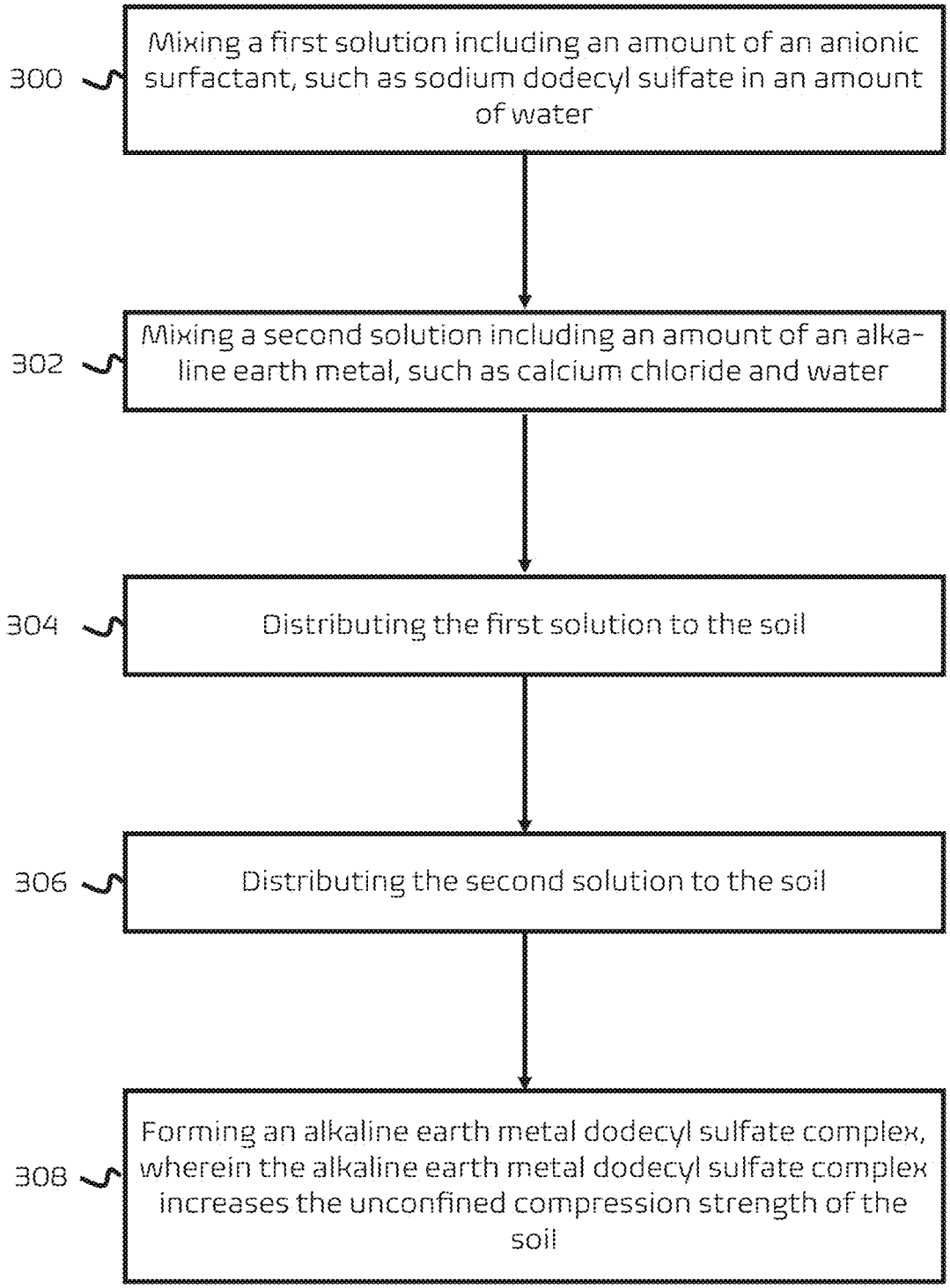
FIG. 12 is a flow chart diagram of an embodiment of the method of increasing the strength of the soil.

Referring now to FIGS. 10-12, in conjunction with FIGS. 1-9B, an exemplary process flow diagrams are provided, depicting embodiments of a method for increasing the strength of the soil. The steps delineated in the exemplary process flow diagrams of FIGS. 10-12 are merely exemplary of a preferred order of a method of increasing soil strength. The steps may be carried out in another order, with or without additional steps included therein. Additionally, the steps may be carried out with an alternative embodiment of the method of increasing soil strength, as contemplated in the description above.

In FIG. 10, the method for increasing the strength of soil begins at step 100, by distributing an amount of an anionic surfactant to the soil. At steps 102, an amount of an alkaline earth metal solution is distributed to the soil. At step 104, the strength of the soil is increased when both the surfactant and alkaline earth metal solution are distributed to the soil by the formation of an alkaline earth metal dodecyl sulfate complex.

In FIG. 11, an embodiment of the method for increasing the strength of the soils begins at step 200, by distributing to the soil a first aqueous solution including the anionic surfactant sodium dodecyl sulfate (SDS). The SDS dissociates into sodium ions and dodecyl sulfate ions when in the first aqueous solution. When the first aqueous solutions critical micelle concentration is exceeded, a plurality of micelles are formed. Each micelle includes an interior hydrophobic pocket that is capable of absorbing the soil, thereby solubilizing the soil into an aqueous soil media. At step 202, an alkaline earth metal solution is distributed to the aqueous soil media thereby mixing the alkaline earth metal solution and the aqueous soil media. In step 204, an alkaline earth metal dodecyl sulfate complex is formed that increases the strength of the soil.

In FIG. 12, an embodiment of the method for increasing the strength of the soils begins at step 300 by mixing a first solution having an amount of an anionic surfactant, such as sodium dodecyl sulfate and an amount of water. When in solution, the sodium dodecyl sulfate dissociates and forms a plurality of micelles. At step 032, a second solution is mixed containing an amount of an alkaline earth metal, such as calcium chloride, and an amount of water. At step 304, the first solution is then distributed to the soil creating a plurality of micelle-soil complexes. When the second solution is distributed to the soil containing the micelle-soil complexes, one dication and two micelle-soil complexes bond at step 306. This bonding forms an alkaline earth metal dodecyl sulfate complex, which increases the UCS of the soil at step 308.

Glossary of Claim Terms

Dication: is any cation, of general formula $X^{2+}$, formed by the removal of two elections from a neutral species.

REFERENCES

Crowley, R., Zimmerman, A. R., Hudyma, N. and Wasman, S. (2019). Application of microbial-induced calcite precipitation for the stabilization of high organic matter soil for roadway construction. FDOT Final Report No. BDV75 977-06, Florida Department of Transportation, Tallahassee, Fla.

Davies, M., Crowley, R., Ellis, T., Hudyma, N., Ammons, P., Matemu, C., Wasman, S., Yahaya, M., Ford, J. and Zimmerman, A. (2019). Microbially induced calcite precipitation using surfactants for the improvement of organic soil. Geo-Congress 2019.

DeJong, J. T., Fritzges, M. B., and Nüsslein, K. (2006). "Microbially Induced Cementation to Control Sand Response to Undrained Shear." *Journal of Geotechnical and Geoenvironmental Engineering*, 132(11), 1381-1392.

Gue S. S., Tan Y. C., and Liew S. S. (2002). "Cost Effective Geotechnical Solutions for Roads and Factories Over Soft Ground." 20*th Conference of the ASEAN Federation of Engineering Organizations*, Cambodia, September 2-5.

Huat, B. B. K., Prasad, A., Asadi, A., and Kazemian, S. (2014). *Geotechnics of Organic Soils and Peat*. CRC Press, Taylor and Francis Group, Boca Raton, Fla.

Lukas, R. (1986). "Dynamic Compaction for Highway Construction, Design and Construction Guidelines, Volume 1." Federal Highway Administration Report FHWARD-86-133.

Mullins, G. and Gunaratne (2015). "Soil Mixing Design Methods and Construction Techniques for Use in High Organic Soils." Florida Department of Transportation, Tallahassee, Fla.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of increasing strength of a soil, the method comprising:
    distributing an anionic surfactant to the soil; and
    distributing an alkaline earth metal solution consisting essentially of at least one alkaline earth metal and a carrier to the soil;
    wherein the anionic surfactant and the alkaline earth metal solution are distributed to the soil in the absence of an addition of bacteria or urea;
    wherein the strength of the soil is increased when the anionic surfactant and the alkaline earth metal solution are mixed thereby forming an anionic surfactant alkaline earth metal complex.

2. The method of claim 1, wherein the anionic surfactant is sodium dodecyl sulfate.

3. The method of claim 1, wherein the alkaline earth metal solution is aqueous calcium chloride.

4. The method of claim 1, wherein the anionic surfactant and the alkaline earth metal solution are distributed to the soil by spraying.

5. The method of claim 1, wherein the anionic surfactant and the alkaline earth metal solution are distributed to the soil by mixing into the soil.

6. The method of claim 1, wherein the anionic surfactant and the alkaline earth metal solution are stoichiometrically balanced.

7. The method of claim 1, wherein the alkaline earth metal solution further comprises two alkaline earth metals.

8. The method of claim 1, wherein the anionic surfactant is distributed to the soil in powdered form.

9. A method of increasing strength of a soil, the method comprising:
    distributing to the soil an anionic surfactant aqueous solution consisting essentially of sodium dodecyl sulfate and aqueous media wherein at least one micelle is formed in the aqueous media wherein upon exceeding critical micelle concentration the soil is absorbed into the at least one micelle to form an aqueous soil media;
    distributing an alkaline earth metal solution to the aqueous soil media wherein the alkaline earth metal solution consisting essentially of at least one alkaline earth metal and a carrier; and
    wherein the anionic surfactant aqueous solution is distributed to the soil in the absence of an addition of bacteria or urea;
    wherein the alkaline earth metal solution is distributed to the aqueous soil media in the absence of an addition of bacteria or urea;

mixing the aqueous soil media and the alkaline earth metal solution to form an alkaline earth metal dodecyl sulfate complex;

wherein the formation of the alkaline earth metal dodecyl sulfate complex strengthens the soil.

10. The method of claim 9, wherein the anionic surfactant aqueous solution and the alkaline earth metal solution are distributed to the soil by spraying.

11. The method of claim 9, wherein the anionic surfactant and the alkaline earth metal solution are distributed to the soil by injection into the soil.

12. The method of claim 9, wherein the anionic surfactant aqueous solution and the alkaline earth metal solution are stoichiometrically balanced.

13. The method of claim 9, wherein the alkaline earth metal solution is aqueous calcium chloride.

14. The method of claim 9, wherein the at least one alkaline metal in the alkaline earth metal solution are aqueous calcium chloride and aqueous magnesium chloride.

15. A method of increasing unconfined compression strength of a soil, the method comprising:

mixing a first solution, the first solution consisting essentially of an amount of sodium dodecyl sulfate and an amount of water, wherein the sodium dodecyl sulfate dissociates when mixed with the water, such that a plurality of micelles are formed;

mixing a second solution, the second solution comprises an amount of calcium chloride and an amount of water, wherein the calcium chloride dissociates into a plurality of calcium ions and a plurality of chloride ions when the calcium chloride is mixed with the water;

distributing the first solution to the soil, such that the soil is capable of being absorbed within the plurality of micelles creating a plurality of micelle-soil complexes; and distributing the second solution to the soil including the micelle-soil complexes, such that one calcium ion of the plurality of calcium ions bonds with two micelle-soil complexes of the plurality of micelles-soil complexes forming a calcium dodecyl sulfate complex;

wherein the first solution and the second solution are distributed to the soil in the absence of an addition of bacteria or urea;

whereby the formation of the calcium dodecyl sulfate complex increases the strength of the soil.

16. The method of claim 15, further comprising distributing a sodium chloride solution to the calcium dodecyl sulfate complex, wherein the sodium chloride solution includes dissolved sodium ions, such that when the sodium chloride solution is distributed to the calcium dodecyl sulfate complex, the calcium ions of the calcium dodecyl sulfate complex exchanges with the dissolved sodium ions, thereby decreasing the strength of the soil.

17. The method of claim 15, wherein the first solution and the second solution are stoichiometrically balanced.

18. The method of claim 15, wherein the distribution of the first and the second solutions is by spraying.

19. The method of claim 15, wherein the distribution of the first and the second solutions is by mixing.

20. The method of claim 15, wherein the second solution further comprises an amount of magnesium chloride, such that the magnesium chloride dissociates into a plurality of magnesium ions and a plurality of chloride ions when the magnesium chloride is mixed in the second solution.

* * * * *